Figure 1:
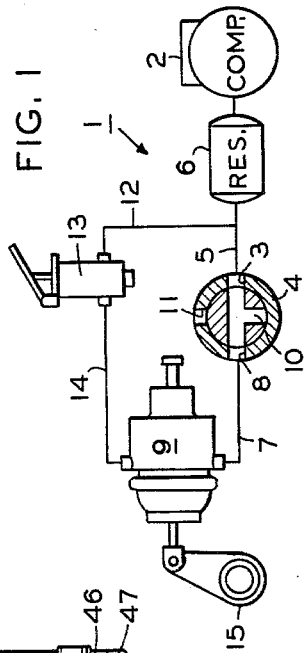

March 15, 1966  O. B. CRUSE  3,240,129
DISABLING MEANS FOR A FRICTION DEVICE OPERATING MECHANISM
Filed May 28, 1964

INVENTOR
OLIVER B. CRUSE
BY
*Joseph E. Papin*

United States Patent Office 3,240,129
Patented Mar. 15, 1966

3,240,129
DISABLING MEANS FOR A FRICTION DEVICE
OPERATING MECHANISM
Oliver B. Cruse, Florissant, Mo., assignor to Wagner Electric Corporation, St. Louis, Mo., a corporation of Delaware
Filed May 28, 1964, Ser. No. 371,002
8 Claims. (Cl. 92—130)

This invention relates to friction device operating mechanism having resiliently urged means therein for mechanically energizing a friction device and in particular to novel emergency release or disabling means for disabling said resiliently urging means.

In the past, the fluid pressure braking systems of heavy duty vehicles were equipped with friction device operating mechanisms having resiliently urged means responsive to fluid pressure supplied thereto less than a predetermined amount from a source of said fluid pressure to mechanically effect emergency energization of a friction device, and said friction device operating mechanism was also provided with a friction device actuator responsive to fluid pressure metered thereto to effect normal or service energization of said friction device. Of course, the mechanical energization of the vehicle friction device under emergency conditions by the aforementioned resiliently urged means often occurred at inopportune times which might place the vehicle in a dangerous position with respect to other vehicles; therefore, it is mandatory to provide disabling means for disabling or releasing the force of said resiliently urged means under such emergency conditions to provide for movement of the vehicle to a more convenient or safer position in order to correct the difficiencies in the vehicle fluid pressure system which effected the reduction of fluid pressure below the predetermined amount resulting in the emergency function of the resiliently urged means. One of the disadvantages or undesirable features of such past disabling means was that a plug, boot or other such closure member was necessarily removably secured to the friction device operating mechanism to prevent entry of foreign particles or dirt into the interior thereof through an opening in said friction device operating mechanism providing access to said disabling means for driving tool insertion purposes. Of course, such removably secured closure members were easily lost, and in many instances not replaced through negligence or the like, thereby providing an entry through the unprotected access opening for foreign particles or dirt which seriously impaired the effectiveness and fluid pressure integrity of the friction device operating mechanism. Other past disabling means were removably secured in the friction device operating mechanism access opening and invertible into driving engagement with said resiliently urged means; however, such invertible disabling means were also often displaced from the access opening through vibration, road shock, etc., and through negligence also lost or not replaced after use.

An object of the present invention is to provide disabling means for a friction device operating mechanism which overcome the aforementioned undesirable features.

Another object of the present invention is to provide novel emergency release or disabling means for disabling resiliently urged means operable in a friction device operating mechanism in response to the failure of fluid pressure applied thereto from a source of said fluid pressure to mechanically energize a friction device.

Another object of the present invention is to provide disabling means for a friction device operating mechanism which inherently forms a closure for said friction device operating mechanism.

Another object of the present invention is to provide disabling means for a friction device operating mechanism which obviates the necessity of a closure member or other means to prevent the entry of foreign material or particles, such as dirt, into said friction device operating mechanism.

Another object of the present invention is to provide means for disabling the resiliently urged friction device energizing means of a friction device operating mechanism wherein said disabling means is normally releasably secured in sealing engagement with said friction device operating mechanism to prevent the entry of foreign particles thereinto and movable in response to an applied force to a position in bearing engagement with said friction device operating mechanism and in driving engagement with said resiliently urged means to effect movement of said resiliently urged means in a friction device de-energizing direction.

Still another object of the present invention is to provide disabling means for a friction device operating mechanism which is maintained therein against displacement.

And still another object of the present invention is to provide a novel disabling means or emergency release mechanism for a friction device operating mechanism which is economically manufactured and easily assembled in a friction device operating mechanism.

These and other objects and advantages of the present invention will become apparent hereinafter.

Briefly, the invention embodies emergency release or disabling means for operative connection with resiliently urged means of a friction device operating mechanism to release or contain the friction device energizing force of said resiliently urged means, said disablying means being normally releasably secured to the housing of said friction device operating mechanism in such a manner as to prevent displacement therefrom and to provide a closure or seal against the entry of foreign particles thereinto.

Figure 2:
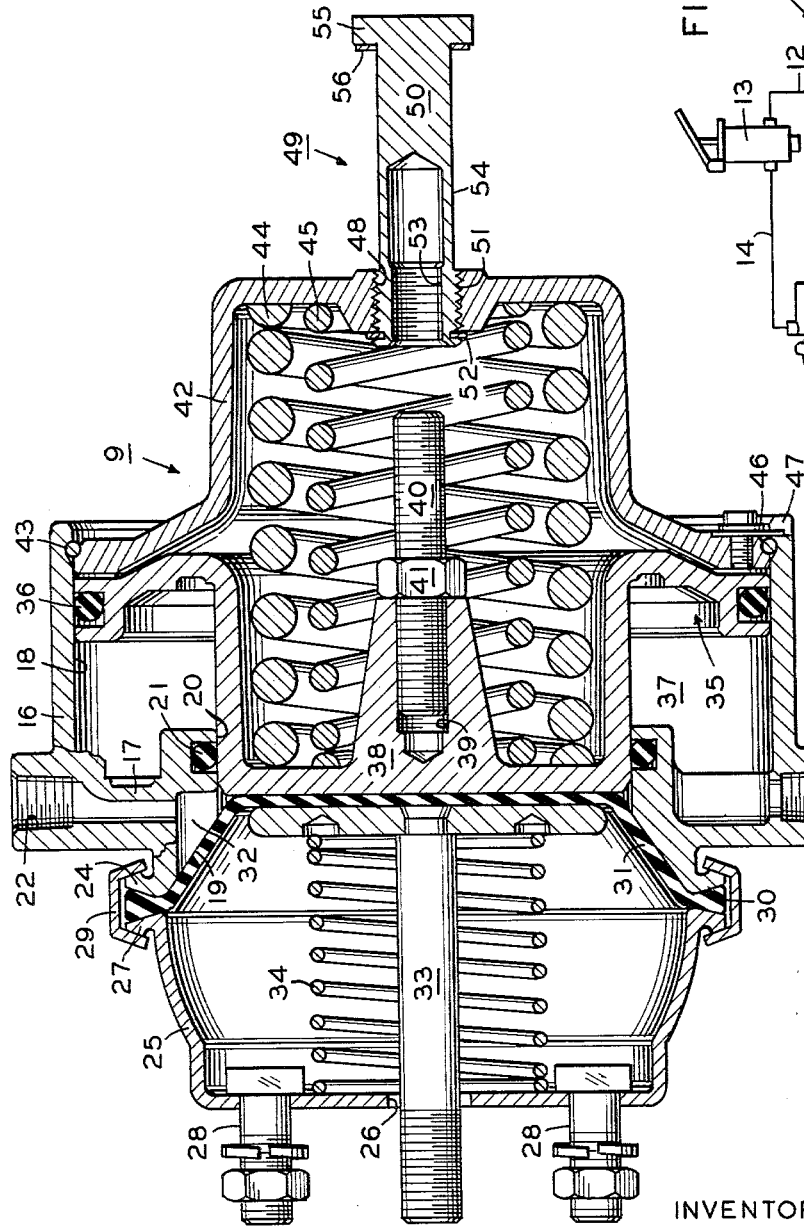

In the drawing which illustrates embodiments of the invention,

FIGURE 1 is a diagrammatic view of a fluid pressure system having a friction device operating mechanism embodying the present invention shown therein, and FIGURE 2 is a greatly enlarged cross-sectional view of the friction device operating mechanism shown in FIGURE 1.

Referring now to FIGURE 1 in detail, a friction device actuating system, indicated generally at 1, is provided with fluid pressure generating means, such as compressor 2, which is connected to an inlet 3 of a charging or control valve 4 by a conduit 5, and a fluid pressure storage reservoir 6 is interposed in the conduit 5 providing, in combination with said compressor, a source of fluid pressure. Another conduit 7 is interposed between an outlet 8 of the charging valve 4 and the emergency port of a friction device operating mechanism or actuating cylinder 9. The charging valve 4 is provided with rotatable passage means 10 connecting the inlet 3 with the outlet 8; however, said passage means can be rotated clockwise to a position interrupting pressure fluid communication between said inlet and outlet and establishing pressure fluid communication between said outlet and an exhaust port 11 to vent said outlet to atmosphere. A conduit 12 has one end intersecting the conduit 5 and the other end thereof connecting with the inlet side of an application valve 13, and another conduit or service line 14 is interposed between the outlet or service side of said application valve and the service or inlet port of the actuating cylinder 9. To complete the system 1, a push rod of the actuating cylinder 9 is pivotally connected with linkage means or an actuating lever, such as slack adjuster 15, for energizing a friction device (not shown).

The actuating cylinder 9, FIGURE 2, is provided with a housing 16 having an annular wall 17 therein interposed between a bore 18 and a tapered bore 19, and an aperture or bore 20 having an O-ring seal 21 sealably disposed therein is provided through the wall 17. A service or inlet port 22 which receives the conduit 14, as previously mentioned, is provided in the housing 16 connecting with the tapered bore 19, and an emergency port 23 which receives the conduit 7, as previously mentioned, connects with the bore 18. The housing 16 is provided with a peripheral flange 24 on the leftward end thereof, and a concave or dish-shaped end plate or fixed housing 25 is provided with a centrally located aperture 26 therein and a peripheral flange 27 positioned in opposed relation with the flange 24. The end plate housing 25 is also provided with a plurality of mounting studs 28 for connection with a cooperating mounting bracket (not shown) on or adjacent to the friction device.

A conventional, releasable clamping band 29 is positioned in clamping engagement with the opposed peripheral flanges 24, 27 serving to maintain a peripheral bead 30 of a diaphragm 31 in sealable abutting engagement therebetween, and an actuating or service chamber 32 is formed in the housing tapered bore 19 between the diaphragm 31 and the wall 17 in pressure fluid communication with the service port 22. A push rod 33 extends coaxially through the end plate aperture 26 having an exterior or working end pivotally connected with the slack adjuster 15, as previously mentioned, and an interior end biased into engagement with the diaphragm 31 by the compressive force of a return spring 34 interposed between the end plate 25 and said push rod.

The larger portion of a stepped emergency or power piston, indicated generally at 35, is slidably received in the housing bore 18 having an O-ring seal 36 disposed in the peripheral portion thereof in sealable engagement with said housing bore, and the smaller portion thereof is slidably received in the wall bore 20 in sealable engagement with the O-ring seal 21 therein, said piston defining in said housing bore 18 an expansible fluid pressure emergency chamber 37 in pressure fluid communication with emergency port 23. The smaller portion of the stepped piston 35 is provided with a working end or end wall positioned in said actuating chamber 32 normally in abutting engagement with the diaphragm 31. A centrally located, integrally formed extension or projection 38 is provided on the smaller portion of the piston 35 having a threaded bore 39 therein, and a threaded extension or stud 40 is threadedly received in said piston extension bore and retained therein against displacement by a lock nut 41 threadedly received on said stud in locking engagement with the rightward or free end of said piston extension.

A removable base wall or closure member 42 is slidable in the housing bore 18 and retained therein against displacement by a groove and lock ring assembly 43 provided in the rightward end of said housing bore 18. The compressive force of emergency springs 44, 45 interposed between the piston 35 and the closure member 42 serves not only to bias said piston in a leftwardly or working direction but also serves to bias said closure member into abutting engagement with the retaining ring 43 which retains said closure member against displacement from the rightward end of the housing bore 18. A wedge or radially extending projection 46 connected with the closure member 42 extends into a slot 47 provided in the rightward end of the housing 16 to prevent rotation of said closure member in the housing bore 18, and a threaded aperture 48 is provided in said closure member being substantially coaxial with the threaded stud 40 of the piston 35.

Emergency or disabling means, indicated generally at 49, is provided with a body portion 50 having a threaded peripheral portion 51 adjacent the leftward or interior end thereof which is normally threadedly engaged with the closure member threaded opening 48 in such a manner as to prevent the entry of foreign particles into the interior of the closure member 42 and housing bore 18. A snap or retaining ring and groove assembly 52 is also provided on the body portion 50 adjacent the interior end thereof in abutment with the closure member 42 about the opening 48 therein to obviate displacement of the disabling means body 50 from said closure member, and a blind, threaded bore 53 is axially provided through the interior end of said body portion for threaded engagement with the threaded piston extension 40, the interior end of said body portion being in predetermined axially spaced relation with said threaded piston extension. The mid-portion of the body portion 50 is provided with a reduced periphery, as shown at 54, to provide for axial movement of said body portion through the threaded closure member opening 48, and the rightward or exterior end of said body member is provided with a force receiving flange 55 having a shoulder 56 for bearing engagement with the closure member 42 about said opening therein, as will be described hereinafter.

In the operation, with the component parts of the system 1 and actuating cylinder 9 positioned as described and shown in FIGURES 1 and 2, the fluid pressure in the reservoir 6 and the actuating cylinder emergency chamber 37 is in excess of a predetermined value necessary to create an emergency force when acting on the effective area of the piston 35 in said emergency chamber to overcome the compressive forces of the springs 44, 45 and maintain said piston in its inoperative or non-working position, as shown.

To effect normal or service energization of the friction device (not shown) an applied force on the application valve 13 meters fluid pressure from the reservoir 6 through conduits 5 and 12, said application valve, the conduit 14, and the service port 22 into the service chamber 32 to act in the effective area of the diaphragm 31 creating a service force to move said diaphragm and push rod 33 leftwardly against the return spring 34 thereby rotating the slack adjuster 15 and energizing the friction device (not shown) connected therewith. When the desired vehicle deceleration or a complete stop is attained, removal of the applied force from the application valve 13 effects the exhaust of pressure fluid from the service chamber 32 through the service port 22, the conduit 14 and the exhaust of said application valve to atmosphere thereby eliminating the service force. Upon the elimination of the service force, the return spring 34 serves to return the push rod 33 and diaphragm 31 to their normal positions thereby providing for de-energization of the friction device.

In an emergency condition when the fluid pressure in the reservoir 6 and actuating cylinder emergency chamber 37 is reduced to a value less than the predetermined value due to leaks in the system 1 or a non-producing compressor 2, or the like, the emergency force opposing the emergency springs 44, 45 is correspondingly reduced, and the compressive forces of the emergency springs thereby serve to move the piston 35 from the inoperative position thereof leftwardly toward an operative position in abutting engagement with the housing wall 17. Since the smaller portion of the piston 35 is normally in driving engagement with the diaphragm 31 in the service chamber 32, this leftward movement of said piston by the springs 44, 45 mechanically moves said diaphragm and push rod 33 leftwardly therewith to rotate the slack adjuster 15 and mechanically effect energization of the friction device connected therewith.

With the component parts of the system 1 and actuating cylinder 9 positioned as above described, the friction device is now mechanically energized to effect an emergency vehicle stop. As previously mentioned hereinbefore, such emergency stops can occur at inopportune times and place the vehicle in a dangerous position with respect to other vehicles on the road; therefore, upon such emergency stops, it is often advantageous to move the vehicle to a less dangerous position in order to correct the failure of the system 1 and subsequently re-establish normal operating conditions wherein the system fluid pressure is greater than the predetermined value.

Disabling or emergency release means 49 are provided to overcome the above-described emergency function of the actuating cylinder 9 by containing or releasing the force of the emergency springs 44, 45 which, in conjunction with the resiliently urged piston 35, serves to mechanically energize the friction device under such emergency conditions as follows: A rotative force on the flange 55 of the disabling means body member 50 effects threaded disengagement of the threaded peripheral portion 51 thereof from the closure member bore 48, and said body member is then manually moved in an axially leftwardly direction and again rotated to threadedly engage the threaded bore 53 thereof with the threaded piston extension 40 until the shoulder 56 is moved leftwardly into bearing engagement with the closure member 42 about said bore 48 therein. With the body member bore 50 threadedly engaged with the stud 40 and the flange shoulder 56 in bearing engagement with the closure member 42, a subsequent rotative force applied by a tool, such as a wrench or the like (not shown), on the body flange 55 effects further threaded engagement between said body bore and stud which serves to move the piston 35 rightwardly against the force of the emergency springs 44, 45 toward the inoperative position thereof. When the piston 35 is moved by the disabling means 49 a predetermined distance toward the inoperative position thereof, the mechanical friction device energizing force of the springs 44, 45 and said piston is sufficiently overcome to deenergize the friction device so that the vehicle can be moved to a more advantageous and/or less dangerous position. Of course, the return spring 34 effects rightward movement of the component parts associated therewith in follow-up relation with the working end of the piston 35 to rotate the slack adjuster 15 and de-energize the friction device. With the force of the springs 44, 45 so contained between the closure member 42 and the piston 35 through the substantially rigid, threaded interconnection of the disabling means 49 and stud 40, the clamping band 29 can be removed to replace or service the various parts in the actuating chamber 32 without fear of the housing 16 being expelled from the end plate 25 by the force of said springs 44, 45. Further, the rigidly interconnected closure member 42 and piston 35 can be removed from the housing bore 18 upon removal of the split retaining ring 43 without fear of expulsion since the compressive forces of the springs 44, 45 are positively contained.

When the fluid pressure failure of the system 1 has been corrected and the fluid pressure in the reservoir 6 and actuating cylinder emergency chamber 37 is increased to a value in excess of the predetermined value wherein normal operating conditions are now re-established, the emergency force is correspondingly increased and serves to maintain the piston 35 in its inoperative position against the emergency spring force. In this event, the disabling means body 50 can now be rotated out of threaded engagement with the stud 40 and thereafter returned to its original position in threaded engagement with the closure member opening 48 to again prevent the entry fo foreign particles therethrough into the closure member 42 and housing bore 16.

The operator may initiate the emergency function of the actuating cylinder 9, if desired, by "dynamiting" the system 1. To "dynamite" the system 1, the operator merely rotates the rotatable passage means 10 of the charging valve 4 in a clockwise direction to a position aligned between the outlet 8 and exhaust port 11 thereby exhausting pressure fluid from the emergency chamber 37 through the emergency port 23 into the conduit 7 and therefrom via said outlet passage means and exhaust port of the charging valve 4 to the atmosphere. With the emergency chamber vented to atmosphere, the emergency function of the actuating cylinder 9 is initiated, as described hereinbefore, to energize the friction device.

From the foregoing, it is now apparent that a novel disabling means for a friction device operating mechanism meeting the objects set out hereinbefore is provided and that changes or modifications as to the precise configurations, shapes and details of the construction set forth in the disclosure by way of illustration may be made by those skilled in the art without departing from the spirit of the invention as defined by the claims which follow.

The embodiments of the invention in which an exclusive property or privilege is claimed are defined as follows:

1. A friction device operating mechanism comprising a housing, resiliently urged means movable in said housing and defining therewith an expansible fluid pressure chamber, a working end on said resiliently urged means exteriorly of said chamber, said resiliently urged means being movable in response to fluid pressure in said chamber less than a predetermined amount to energize said working end, an opening in said housing, a disabling member extending through said opening in releasable engagement with said housing in the inoperative position thereof including means for preventing displacement of said disabling member from said opening, driving means for driving engagement with said resiliently urged means, and bearing means for bearing engagement with said housing, said disabling member being manually movable from the inoperative position subsequent to disengagement thereof from said housing to an operative position engaging said driving means with said resiliently urged means and engaging said bearing means with said housing, and said disabling member being thereafter further movable in response to an applied force to mechanically drive said resiliently urged means in a direction to de-energize said working end.

2. The friction device operating mechanism according to claim 1 comprising threaded portions in said opening and on said disabling member threadedly engaged in the inoperative position of said disabling member to close said opening and prevent the entry of foreign particles therethrough into said housing.

3. The friction device operating mechanism according to claim 1 wherein said displacement preventing means comprises an abutment connected with said member interiorly of said housing and normally engaged with said housing about said opening.

4. A friction device operating mechanism comprising a housing, resiliently urged means movable in said housing and defining therewith an expansible fluid pressure chamber, a working end on said resiliently urged means extending exteriorly of said chamber, said resiliently urged means being movable in response to fluid pressure in said chamber less than a predetermined amount to energize said working end, extension means on said resiliently urged means, a threaded opening in said housing substantially coaxial with said extension means, disabling means for said resiliently urged means including a body member extending through said opening and normally threadedly engaged therewith in its inoperative position, abutment means on said member normally engaged with said housing to prevent displacement of said member from said housing through said opening, driving means on said member for driving engagement with said extension means and normally spaced therefrom, and bearing means on said member for bearing engagement with said housing and normally spaced therefrom, said member being initially threadedly movable from the inoperative position thereof and disengaged from said opening to an operative position drivingly engaging said driving means with said extension means and engaging said bearing means with said housing, and said member being thereafter further movable in response to an applied force to mechanically drive said extension means and resiliently urged means in a direction to de-energize said working end.

5. The friction device operating mechanism according to claim 4 comprising a threaded portion on said extension means, and said driving means including a threaded bore in said member and normally axially spaced from said extension means in the inoperative position of said member, said threaded bore being threadedly engaged with said threaded portion in the operative position of said member to effect the mechanical driving of said extension means and resiliently urged means in response to the applied force on said member.

6. A friction device operating mechanism comprising a housing, resiliently urged means movable in said housing and defining therewith an expansible fluid pressure chamber, a working end on said resiliently urged means extending exteriorly of said chamber, said resiliently urged means being movable in response to fluid pressure in said chamber less than a predetermined amount to energize said working end, an opening in said housing, a disabling member extending through said opening and having opposed ends interiorly and exteriorly of said housing, respectively, positioning means on said member adjacent to said interior end and releasably engaged with said housing within said opening, abutment means on said member adjacent to said interior end and engaged with an interior portion of said housing to prevent displacement of said member from said housing, driving means on the interior end of said member for driving engagement with said resiliently urged means and normally spaced therefrom, and bearing means on said member adjacent to said exterior end for bearing engagement with said housing and normally spaced therefrom, said member being movable through said opening subsequent to the release of said positioning means from engagement with said housing to an operative position drivingly engaging said driving means with said resiliently urged means and engaging said bearing means in bearing engagement with said housing wherein said member provides a substantially rigid connection between said housing and resiliently urged means to contain the energizing force thereof, and said member being thereafter movable in response to an applied force thereon to mechanically drive said resiliently urged means in a direction to deenergize said working end while maintaining the rigid connection between said housing and resiliently urged means.

7. The friction device operating mechanism according to claim 6 comprising a threaded extension on said resiliently urged means, and said driving means including a threaded bore in said member connecting with said interior end and normally spaced from said extension, said bore being threadedly engaged with said extension in the operative position of said member to effect the mechanical driving of said resiliently urged means in response to the applied force on said member.

8. A friction device operating mechanism comprising a housing, resiliently urged means movable in said housing and defining therewith an expansible fluid pressure chamber, a working end on said resiliently urged means extending exteriorly of said chamber, said resiliently urged means being movable in response to fluid pressure in said chamber less than a predetermined amount to energize said working end, threaded extension means on said resiliently urged means, a threaded opening in said housing substantially aligned with said extension means, a disabling member extending through said opening and having opposed end portions internally and externally of said housing, respectively, a threaded peripheral portion on said member adjacent to said interior end and normally threadedly engaged with said opening, abutment means on said member adjacent to said interior end and normally engaged with an interior portion of said housing about said opening to prevent displacement of said interior end through said opening, a threaded bore in said member extending through said interior end and substantially aligned with said extension means, radially extending flange means on said member adjacent to said exterior end, a bearing portion on said flange means for bearing engagement with an exterior portion of said housing about said opening and normally spaced therefrom, said member being initially movable in response to an applied force to threadedly disengage said threaded peripheral portion from said opening and then movable through said opening to threadedly engage said bore therein with said threaded extension means until said bearing portion of said flange means is positioned in bearing engagement with said exterior portion of said housing wherein said member provides a substantially rigid connection between said housing and resiliently urged means to contain the energizing force of said resiliently urged means, and said member being thereafter movable in response to the applied force on said flange means to effect further threaded engagement of said bore with said extension means and drive said resiliently urged means in a direction to de-energize the working end thereof.

No references cited.

SAMUEL LEVINE, *Primary Examiner.*